US011348465B2

(12) United States Patent
Jiang et al.

(10) Patent No.: US 11,348,465 B2
(45) Date of Patent: May 31, 2022

(54) METHOD AND APPARATUS FOR UPDATING INFORMATION

(71) Applicants: Baidu Online Network Technology (Beijing) Co., Ltd., Beijing (CN); Baidu USA LLC, Sunnyvale, CA (US)

(72) Inventors: He Jiang, Beijing (CN); Jinxin Zhao, Sunnyvale, CA (US); Ruigang Yang, Beijing (CN)

(73) Assignees: BAIDU ONLINE NETWORK TECHNOLOGY (BEIJING) CO., LTD., Beijing (CN); BAIDU USA LLC, Sunnyvale, CA (US)

( * ) Notice: Subject to any disclaimer, the term of this patent is extended or adjusted under 35 U.S.C. 154(b) by 45 days.

(21) Appl. No.: 16/896,703

(22) Filed: Jun. 9, 2020

(65) Prior Publication Data

US 2021/0118286 A1 Apr. 22, 2021

(30) Foreign Application Priority Data

Oct. 21, 2019 (CN) .......................... 201910999025.X

(51) Int. Cl.
*G08G 1/16* (2006.01)
*G08G 1/00* (2006.01)
(Continued)

(52) U.S. Cl.
CPC ....... *G08G 1/167* (2013.01); *G08G 1/096741* (2013.01); *G08G 1/166* (2013.01);
(Continued)

(58) Field of Classification Search
CPC .......... G05D 1/00; G05D 1/02; G05D 1/0276; G05D 1/0293; G01C 21/00; G01C 21/005;
(Continued)

(56) References Cited

U.S. PATENT DOCUMENTS 9,672,734 B1 * 6/2017 Ratnasingam ....... G08G 1/0968
2006/0155427 A1 * 7/2006 Yang ..................... G08G 1/081
701/1

(Continued)

FOREIGN PATENT DOCUMENTS

CN 107609633 1/2018
CN 107610494 1/2018
(Continued)

OTHER PUBLICATIONS

NPL_search (Sep. 20, 2021).*

*Primary Examiner* — Van T Trieu
(74) *Attorney, Agent, or Firm* — Knobbe Martens Olson & Bear LLP

(57) ABSTRACT

Embodiments of the present disclosure relate to a method and apparatus for updating information. The method may include: acquiring road network structure information of a target road network and vehicle information of a target number of vehicles in the target road network, the vehicle information including initial state information, perception information and positioning information, and the vehicle information being constrained by the road network structure information; selecting a target vehicle from the target number of vehicles; determining, based on a vehicle dynamics model, a reference speed at which the target vehicle passes a preset time step; and updating vehicle information of a vehicle in the target road network based on the reference speed of the target vehicle.

20 Claims, 6 Drawing Sheets

(51) Int. Cl.
*H04W 4/44* (2018.01)
*G08G 1/0967* (2006.01)
*G08G 1/01* (2006.01)
*G08G 1/052* (2006.01)

(52) U.S. Cl.
CPC ............... *G08G 1/20* (2013.01); *H04W 4/44* (2018.02); *G08G 1/0116* (2013.01); *G08G 1/052* (2013.01)

(58) Field of Classification Search
CPC .......... G08G 1/00; G08G 1/01; G08G 1/052; G08G 1/0968; G08G 1/166; G08G 1/167; B60W 10/18; B60W 10/20; B60W 30/00; B60W 30/09; B60W 40/06; B60W 40/09; G06F 19/00
See application file for complete search history.

(56) References Cited

U.S. PATENT DOCUMENTS

| | | | |
|---|---|---|---|
| 2018/0259976 A1* | 9/2018 | Williams | G01C 21/32 |
| 2019/0291726 A1* | 9/2019 | Shalev-Shwartz | B60W 30/18154 |
| 2019/0299984 A1 | 10/2019 | Shalev-Shwartz | |

FOREIGN PATENT DOCUMENTS

| | | |
|---|---|---|
| CN | 107856668 | 3/2018 |
| CN | 109684702 | 4/2019 |

\* cited by examiner

METHOD AND APPARATUS FOR UPDATING INFORMATION

CROSS-REFERENCE TO RELATED APPLICATIONS

This application claims priority to Chinese Application No. 201910999025.X, filed on Oct. 21, 2019 and entitled "Method and Apparatus for Updating Information," the entire disclosure of which is hereby incorporated by reference.

TECHNICAL FIELD

Embodiments of the present disclosure relate to the field of computer technology, and specifically to a method and apparatus for updating information.

BACKGROUND

With the rapid development of the computer technology, the use of a traffic flow simulation technique to study a traffic behavior has drawn more and more attention. The traffic flow simulation technique is a technique of tracking and describing the change of a traffic motion with time and space, and relates to a mathematical model of describing the real-time motion of a traffic transportation system in a certain period of time. According to the granularity of a simulation object, the traffic flow simulation technique may be divided into micro traffic simulation, meso traffic simulation and macro traffic simulation.

Related approaches generally include an intelligent driver model, a rapidly-exploring random tree (RRT) method, a deep learning method, and the like. At present, the approaches are widely applied in a traffic engineering theory research, a road geometry design scheme analysis, a traffic management system design scheme evaluation analysis, a road traffic safety analysis and an intelligent traffic system (ITS).

SUMMARY

Embodiments of the present disclosure provide a method and apparatus for updating information.

In a first aspect, an embodiment of the present disclosure provides a method for updating information, including: acquiring road network structure information of a target road network and vehicle information of a target number of vehicles in the target road network, the vehicle information including initial state information, perception information and positioning information, and the vehicle information being constrained by the road network structure information; selecting a target vehicle from the target number of vehicles; determining, based on a vehicle dynamics model, a reference speed at which the target vehicle passes a preset time step; and updating vehicle information of a vehicle in the target road network based on the reference speed of the target vehicle.

In some embodiments, the determining, based on the vehicle dynamics model, the reference speed at which the target vehicle passes the preset time step includes: determining a safe distance of the target vehicle based on the positioning information of the target number of vehicles, the safe distance being used to indicate a distance between the target vehicle and an adjacent vehicle; determining a brake reaction distance of the target vehicle based on the initial state information of the target vehicle; determining a reference acceleration of the target vehicle based on a quantitative relationship between the safe distance and the brake reaction distance; and determining, based on the reference acceleration, the reference speed at which the target vehicle passes the preset time step.

In some embodiments, the determining, based on the reference acceleration, the reference speed at which the target vehicle passes the preset time step includes: determining lane change information of the target vehicle based on the acquired vehicle information, the lane change information being used to indicate whether the target vehicle changes a lane to drive; and determining, based on the lane change information and the reference acceleration, the reference speed at which the target vehicle passes the preset time step.

In some embodiments, a preset lane change driving condition includes a random lane change triggering condition and a random lane change decision condition, and the determining lane change information of the target vehicle based on the acquired vehicle information includes: determining, in response to determining the random lane change triggering condition being satisfied, whether the random lane change decision condition is satisfied; and generating the lane change information of the target vehicle based on whether the random lane change decision condition is satisfied.

In some embodiments, the preset lane change driving condition includes an active lane change triggering condition, the lane change information includes lane change position information, and the determining lane change information of the target vehicle based on the acquired vehicle information includes: determining, in response to determining the active lane change triggering condition being satisfied, a distance between an associated vehicle of an adjacent lane and the target vehicle, the associated vehicle including a vehicle located in an adjacent lane of an identical direction of the target vehicle, having a closest distance from the target vehicle and falling behind the target vehicle; generating, in response to determining the distance being less than a target threshold, lane change position information for indicating a lane change performed by driving to be behind the associated vehicle; and generating, in response to determining the distance being greater than the target threshold, lane change position information for indicating a lane change performed by driving to be ahead of the associated vehicle.

In some embodiments, the initial state information further includes vehicle path information generated based on the road network structure information, and the updating vehicle information of the vehicle in the target road network based on the reference speed of the target vehicle includes: determining, based on the reference speed of the target vehicle, new positioning information of the target vehicle passing the preset time step; updating vehicle information of the target vehicle based on the reference speed and the new positioning information; updating the vehicle information of the target number of vehicles based on the updating for the vehicle information of the target vehicle; and generating traffic information of the target road network based on the vehicle path information in the vehicle information of the target number of vehicles, the traffic information being used to indicate a speed and a position of the vehicle in the target road network after the vehicle passes a target number of preset time steps.

In some embodiments, the method further includes: sending the traffic information of the target road network to a display device; generating road facility control information based on the traffic information of the target road network; and sending the road facility control information to a target device.

In a second aspect, an embodiment of the present disclosure provides an apparatus for updating information, including: an acquiring unit, configured to acquire road network structure information of a target road network and vehicle information of a target number of vehicles in the target road network, the vehicle information including initial state information, perception information and positioning information, and the vehicle information being constrained by the road network structure information; a selecting unit, configured to select a target vehicle from the target number of vehicles; a determining unit, configured to determine, based on a vehicle dynamics model, a reference speed at which the target vehicle passes a preset time step; and an updating unit, configured to update vehicle information of a vehicle in the target road network based on the reference speed of the target vehicle.

In some embodiments, the determining unit includes: a first determining subunit, configured to determine a safe distance of the target vehicle based on the positioning information of the target number of vehicles, the safe distance being used to indicate a distance between the target vehicle and an adjacent vehicle; a second determining subunit, configured to determine a brake reaction distance of the target vehicle based on the initial state information of the target vehicle; a third determining subunit, configured to determine a reference acceleration of the target vehicle based on a quantitative relationship between the safe distance and the brake reaction distance; and a fourth determining subunit, configured to determine, based on the reference acceleration, the reference speed at which the target vehicle passes the preset time step.

In some embodiments, the fourth determining subunit includes: a first determining module, configured to determine lane change information of the target vehicle based on the acquired vehicle information, the lane change information being used to indicate whether the target vehicle changes a lane to drive; and a second determining module, configured to determine, based on the lane change information and the reference acceleration, the reference speed at which the target vehicle passes the preset time step.

In some embodiments, a preset lane change driving condition includes a random lane change triggering condition and a random lane change decision condition, and the first determining module includes: a first determining submodule, configured to determine, in response to determining the random lane change triggering condition being satisfied, whether the random lane change decision condition is satisfied; and a first generating submodule, configured to generate the lane change information of the target vehicle based on whether the random lane change decision condition is satisfied.

In some embodiments, the preset lane change driving condition includes an active lane change triggering condition, the lane change information includes lane change position information, and the first determining module includes: a second determining submodule, configured to determine, in response to determining the active lane change triggering condition being satisfied, a distance between an associated vehicle of an adjacent lane and the target vehicle, the associated vehicle including a vehicle located in an adjacent lane of an identical direction of the target vehicle, having a closest distance from the target vehicle and falling behind the target vehicle; a second generating submodule, configured to generate, in response to determining the distance being less than a target threshold, lane change position information for indicating a lane change performed by driving to be behind the associated vehicle; and a third generating submodule, configured to generate, in response to determining the distance being greater than the target threshold, lane change position information for indicating a lane change performed by driving to be ahead of the associated vehicle.

In some embodiments, the initial state information further includes vehicle path information generated based on the road network structure information, and the updating unit includes: a fifth determining subunit, configured to determine, based on the reference speed of the target vehicle, new positioning information of the target vehicle passing the preset time step; a first updating subunit, configured to update vehicle information of the target vehicle based on the reference speed and the new positioning information; a second updating subunit, configured to update the vehicle information of the target number of vehicles based on the updating for the vehicle information of the target vehicle; and a generating subunit, configured to generate traffic information of the target road network based on the vehicle path information in the vehicle information of the target number of vehicles, the traffic information being used to indicate a speed and a position of the vehicle in the target road network after the vehicle passes a target number of preset time steps.

In some embodiments, the apparatus further includes: a first sending unit, configured to send the traffic information of the target road network to a display device; a generating unit, configured to generate road facility control information based on the traffic information of the target road network; and a second sending unit, configured to send the road facility control information to a target device.

In a third aspect, an embodiment of the present disclosure provides a server, the server including: one or more processors; and a storage apparatus, storing one or more programs, where the one or more programs, when executed by the one or more processors, cause the one or more processors to implement any embodiment of the method according to the first aspect.

In a fourth aspect, an embodiment of the present disclosure provides a computer readable medium, storing a computer program thereon, where the program, when executed by a processor, implements any embodiment of the method according to the first aspect.

According to a method and apparatus for updating information provided in embodiments of the present disclosure, first, the road network structure information of the target road network and the vehicle information of the target number of vehicles in the target road network are acquired. The vehicle information includes the initial state information, the perception information and the positioning information, and the vehicle information is constrained by the road network structure information. Then, the target vehicle is selected from the target number of vehicles. Next, based on the vehicle dynamics model, the reference speed at which the target vehicle passes the preset time step is determined. Finally, the vehicle information of the vehicle in the target road network is updated based on the reference speed of the target vehicle. Thus, the beneficial effect of improving the authenticity of the traffic simulation result is achieved.

BRIEF DESCRIPTION OF THE DRAWINGS

After reading detailed descriptions for non-limiting embodiments given with reference to the following accompanying drawings, other features, objectives and advantages of the present disclosure will be more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and some features in the disclosure may be combined with each other on a non-conflict basis. Features of the present disclosure will be described below in detail with reference to the accompanying drawings and in combination with embodiments.

Figure 1:
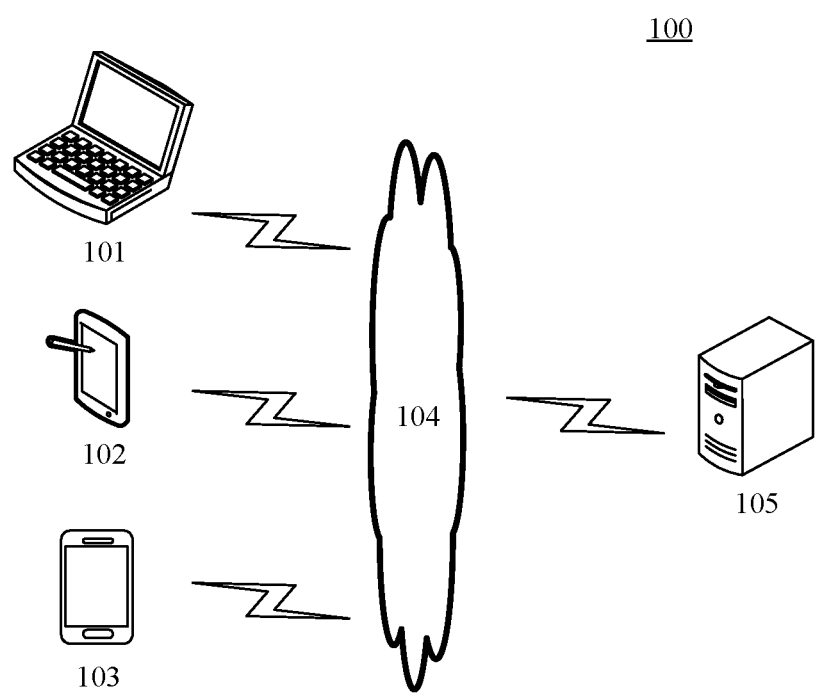
FIG. 1 is a diagram of an example system architecture in which an embodiment of the present disclosure may be implemented.

FIG. 1 illustrates an example system architecture 100 in which a method for updating information or an apparatus for updating information according to embodiments of the present disclosure may be implemented.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, for example, wired or wireless communication links, or optical fiber cables.

The terminal devices 101, 102 and 103 interact with the server 105 via the network 104, to receive or send a message, etc. Various communication client applications (e.g., an instant communication tool, a mailbox client, social platform software and a browser application) may be installed on the terminal devices 101, 102 and 103.

The terminal devices 101, 102 and 103 may be hardware or software. When being the hardware, the terminal devices 101, 102 and 103 may be various electronic devices having a display screen and supporting image display, the electronic devices including, but not limited to, a smart phone, a tablet computer, a laptop portable computer, a desktop computer, etc. When being the software, the terminal devices 101, 102 and 103 may be installed in the above listed electronic devices. The terminal devices may be implemented as a plurality of pieces of software or a plurality of software modules (e.g., software or software modules for providing a distributed service), or may be implemented as a single piece of software or a single software module, which will not be specifically defined here.

The server 105 may be a server providing various services, for example, a backend server providing support for traffic information of a specific road section displayed on the terminal devices 101, 102 and 103. The backend server may perform processing such as an analysis on received road network structure information and received vehicle information, and feedback the processing result (e.g., updated vehicle information) to the terminal devices.

It should be noted that the above road network structure information and the above vehicle information may also be directly stored in the server 105 locally, and the server 105 may directly extract and process the locally stored road network structure information and the locally stored vehicle information. At this point, the terminal devices 101, 102 and 103 and the network 104 may not be included.

It should be noted that the server may be hardware or software. When being the hardware, the server may be implemented as a distributed server cluster composed of a plurality of servers, or may be implemented as a single server. When being the software, the server may be implemented as a plurality of pieces of software or a plurality of software modules (e.g., software or software modules for providing a distributed service), or may be implemented as a single piece of software or a single software module, which will not be specifically defined here.

It should be noted that the method for updating information provided in embodiments of the present disclosure is generally performed by the server 105. Correspondingly, the apparatus for updating information is generally provided in the server 105.

It should be appreciated that the numbers of the terminal devices, the networks and the servers in FIG. 1 are merely illustrative. Any number of terminal devices, networks and servers may be provided based on actual requirements.

Figure 2:
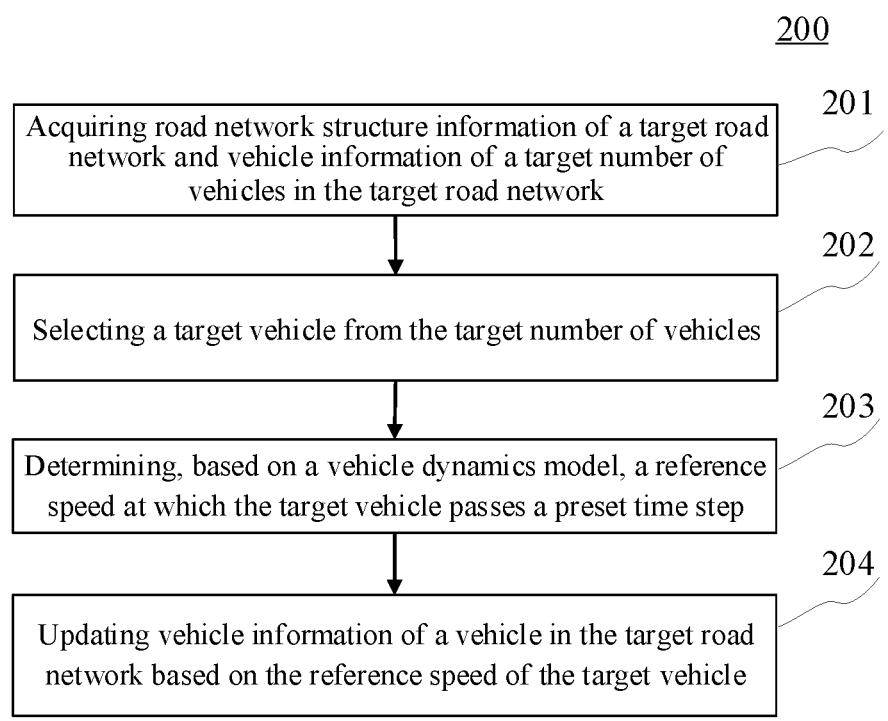
FIG. 2 is a flowchart of a method for updating information according to an embodiment of the present disclosure.

Further referring to FIG. 2, FIG. 2 illustrates a flow 200 of a method for updating information according to an embodiment of the present disclosure. The method for updating information includes the following steps.

Step 201, acquiring road network structure information of a target road network and vehicle information of a target number of vehicles in the target road network.

In this embodiment, an executing body (e.g., the server 105 shown in FIG. 1) of the method for updating information may acquire the road network structure information of the target road network and the vehicle information of the target number of vehicles in the target road network, by means of a wired connection or a wireless connection. Here, the above vehicle information may include initial state information, perception information and positioning information.

In this embodiment, the above target road network may be any road network pre-specified according to an actual application requirement, or may be a road network indicated by the road network information received by the above executing body. For example, the above road network information may include a road network name sent by a terminal or road network configuration data inputted by an administrator. The above road network structure information may be used to indicate a road structure and an intersection structure contained in a road network structure. A road may generally include a plurality of parallel lanes. An intersection may generally serve as a connection point of roads. Accordingly, the above road network structure information may further include lane information and intersection information.

In this embodiment, the above lane information may include information indicating an attribute such as a centerline, a boundary line, an adjacent lane, a pilot road (e.g., a previous lane to which the present lane is connected) and a subsequent road (e.g., a next lane to which the present lane is connected), a connected intersection, or a signal light. The above centerline and the above boundary line may be considered to be composed of a point sequence. Here, two points in the point sequence may be connected by a line segment. The above signal light may be considered to be set at the end of the lane. Thus, the signal light information included in the lane information may be used to indicate whether a vehicle on the lane is allowed to drive out of the lane.

In this embodiment, the above intersection information may include an intersection type and a lane connection point. Here, the intersection type may include, but not limited to, at least one of a crossing (i.e., a crossroads), a lane converging intersection (a road area where the number of lanes is reduced), and a lane diverging intersection (a road area where the number of lanes is increased). Alternatively, the above intersection information may further include a lane starting point and a lane end point that only allow one-way driving.

It should be noted that the above lane connection point is generally not actually present in a real road, but only as a representation of a road connection. There is generally a centerline consisting of a point sequence in the above crossing, the lane converging intersection and the lane diverging intersection. Here, the two points in the above point sequence are generally connected by the line segment.

In this embodiment, the above target number may be any number pre-specified according to an actual application requirement, or may be a number generated by the executing body according to a received vehicle traffic flow density. The above initial state information may include initialized vehicle state information. Here, the above vehicle state information may include, but not limited to, at least one of a size, an acceleration range, a wheel angle range, an expected speed, a position, a speed, a direction, an acceleration, an angular speed, or an angular acceleration of the vehicle. It should be noted that, in order to simplify the calculation, when the vehicle speed is not zero, it may be generally considered that the speed direction is the same as the vehicle direction.

In this embodiment, the above vehicle positioning information may include, but not limited to, at least one of a vehicle position, a vehicle direction, a lane where the vehicle is located, a lateral distance of the vehicle from a centerline of the current road, and an angle between the vehicle direction and the direction of the current road. It should be noted that the above vehicle positioning information may be stored in the memory after being initialized, and may be read at the time of calculation.

In this embodiment, the above vehicle perception information may include, but not limited to, at least one of signal light information of the lane where the vehicle is located, vehicle information of vehicles that are located before and behind the vehicle in the same lane, and vehicle information of vehicles located in the same intersection as the vehicle. Here, the above signal light information of the lane may be preset, or may be updated in an order of green-yellow-red at a preset time interval.

It should be noted that the above vehicle information is generally constrained by the road network structure information. For example, the position indicated by the above positioning information of the vehicle generally does not deviate from the road indicated by the road network structure information.

In some alternative implementations of this embodiment, the above initial state information may further include vehicle path information generated based on the road network structure information. Here, the above vehicle path information may include a sequence consisting of identifiers for representing an intersection and/or a lane.

Step 202, selecting a target vehicle from the target number of vehicles.

In this embodiment, the above executing body may select the target vehicle from the target number of vehicles in various ways. As an example, the above executing body may randomly select one vehicle from the above target number of vehicles. As another example, the above executing body may first determine a preset area (e.g., an intersection or an accident prone road section) from the road network indicated by the road network structure information. Then, the above executing body may select the target vehicle from the above preset area.

Step 203, determining, based on a vehicle dynamics model, a reference speed at which the target vehicle passes a preset time step.

In this embodiment, based on the vehicle dynamics model, the above executing body may determine the reference speed at which the target vehicle passes the preset time step in various ways according to the vehicle information. Here, the above vehicle dynamics model may generally include a physical constraint satisfying a motion of the vehicle. The above physical constraint may include a vehicle attribute constraint and a kinematic model constraint. Here, the above vehicle attribute constraint may be used to indicate that at least one of the speed, the acceleration or the angular speed is within a corresponding preset threshold. The above kinematic model constraint may include a corresponding relationship between a steering wheel angle and the angle of the change of the direction of the vehicle speed. As an example, the above relationship may be expressed by the following formula:

$$\Delta \theta = \frac{\tan(\Phi)}{L} \times v \times \Delta t.$$

Here, $\theta$ may be used to represent the steering wheel angle. $\Phi$ may be used to represent the wheel angle. L may be used to represent a wheelbase. $v$ may be used to represent the vehicle speed. $\Delta t$ may be used to represent the preset time step.

As an example, the above executing body may determine a quasi-reference speed at which the target vehicle passes the preset time step, based on an initial speed and an initial acceleration in the initial state information and the preset time step. Then, the above executing body may determine whether the quasi-reference speed satisfies the constraint of the vehicle dynamics model. In response to determining the quasi-reference speed satisfying the constraint, the above executing body may determine the above quasi-reference speed as the above reference speed.

In some alternative implementations of this embodiment, the above executing body may determine the reference speed at which the target vehicle passes the preset time step through the following steps.

In a first step, a safe distance of the target vehicle is determined based on the positioning information of the target number of vehicles.

In these implementations, based on the positioning information of the target number of vehicles, the above executing body may determine the safe distance of the target vehicle by various means. Here, the above safe distance may be used to indicate a distance between the target vehicle and an adjacent vehicle.

As an example, in a situation where the target vehicle drives on the lane, the above safe distance may be a distance of the target vehicle from a front vehicle (i.e., the closest vehicle in front of the target vehicle in the current lane) in the road direction. Alternatively, when the current lane signal light state of being a red light or a yellow light has lasted for more than 1 second, it may be considered that a vehicle having a speed of 0 and a length of 0 exists at the end of the current lane.

As another example, when the target vehicle drives to a crossing, the above safe distance may be a distance between the target vehicle and a vehicle that is closest to the target vehicle and may collide with the target vehicle. Alternatively, in response to determining a closest distance between the driving routes of the two vehicles being less than a preset safety threshold, the above executing body may determine that there is a collision possibility between the two vehicles.

In a second step, a brake reaction distance of the target vehicle is determined based on the initial state information of the target vehicle.

In these implementations, the above brake reaction distance may be used to represent the distance the target vehicle drives within the brake reaction time. Alternatively, the above brake reaction distance may also be calculated based on a minimum acceleration.

In a third step, a reference acceleration of the target vehicle is determined based on the quantitative relationship between the safe distance and the brake reaction distance.

In these implementations, in response to determining the above safe distance being greater than the brake reaction distance, the above executing body may determine a larger acceleration as the reference acceleration. As an example, the reference acceleration is $a_{ref}=\min(\rho_{acc}\times(v_{limit}-v_t),a_{max})$. Here, min( ) may be used to indicate that a smaller value is taken therein. $\rho_{acc}$ may be used to represent an acceleration coefficient. $v_{limit}$ may be used to represent a speed expected to be achieved. $v_t$ may be used to represent a current speed of the vehicle. $a_{max}$ may be used to represent the maximum acceleration of the vehicle.

In response to determining the safe distance being less than the brake reaction distance, the above executing body may determine a smaller acceleration as the reference acceleration. As an example, the reference acceleration is $a_{ref}=\max(\rho_{red}\times(s_{safe}-s_d),a_{min})$. Here, max( ) may be used to indicate that a larger value is taken therein. $\rho_{red}$ may be used to represent a deceleration coefficient. $s_{safe}$ may be used to indicate the safe distance. $s_d$ may be used to represent the brake reaction distance. $a_{min}$ may be used to represent the minimum acceleration of the vehicle.

In a fourth step, the reference speed at which the target vehicle passes the preset time step is determined based on the reference acceleration.

Alternatively, based on the reference acceleration, the above executing body may further determine the reference speed at which the target vehicle passes the preset time step, according to the following steps.

S1, lane change information of the target vehicle is determined based on the acquired vehicle information.

In these implementations, based on the acquired vehicle information, the above executing body may determine the lane change information of the target vehicle by various means. Here, the above lane change information may be used to indicate whether the target vehicle changes a lane to drive.

Alternatively, a preset lane change driving condition may include a random lane change triggering condition and a random lane change decision condition. Accordingly, the above executing body may first determine whether the random lane change decision condition is satisfied, in response to determining the random lane change triggering condition being satisfied. Then, the lane change information of the target vehicle is generated based on whether the random lane change decision condition is satisfied.

As an example, the above random lane change triggering condition may include that the target vehicle is in a lane and there is an adjacent accessible lane; and that a front vehicle in the lane where the target vehicle is located (the closest vehicle in front of the target vehicle in the same lane) is present and is not in a lane change state. The above random lane change decision condition may simultaneously satisfy: 1) the distance from the front vehicle in the current lane is less than ½ of the distance from a front vehicle in a target lane; 2) the distance from the front vehicle in the target lane along the lane direction is greater than the brake safety distance; and 3) the distance between a following vehicle in the target lane and the target vehicle along the lane direction is greater than the brake safety distance. Here, the above target lane may be used to indicate the lane into which the vehicle changes a lane to drive. The above brake safety distance is used to indicate that the following vehicle maintains a speed, and when the speed of the front vehicle drops to 0, no collision occurs during the safety time. Alternatively, the above random lane change decision condition may further include that the target vehicle is not at the crossing.

Alternatively, the above preset lane change driving condition may include an active lane change triggering condition. The above lane change information may include lane change position information. Thus, the above executing body may first determine a distance between an associated vehicle in an adjacent lane and the target vehicle, in response to determining the above active lane change triggering condition being satisfied. Here, the above associated vehicle may include a vehicle located in an adjacent lane of an identical direction of the target vehicle, and the vehicle has a closest distance from the target vehicle and falls behind the target vehicle. Then, in response to determining the distance being less than a target threshold value, the above executing body may generate lane change position information for indicating a lane change performed by driving to be behind the associated vehicle. In response to determining the distance being greater than the above target threshold, the above executing body may generate lane change position information for indicating a lane change performed by driving to be ahead of the associated vehicle.

As an example, the above active lane change triggering condition may include that the vehicle cannot drive into a lane leading to a target place through a subsequent lane of the current lane, and that there is a subsequent lane, through which the vehicle may drive into the lane leading to the target place, in the road where the current lane is located. Alternatively, the above lane leading to the target place may be represented by the vehicle path information. The above target threshold may be preset, or may be $(L_c/2+L_m/2)$ (where $L_c$ may be used to represent the length of the associated vehicle in the target lane, and $L_m$ may be used to represent the length of the target vehicle).

S2, the reference speed at which the target vehicle passes the preset time step is determined based on the lane change information and the reference acceleration.

Based on the above alternative implementations, the above executing body may adjust the direction of the reference acceleration based on the lane change information, and thus, the reference speed at which the target vehicle passes the preset time step is determined.

Step 204, updating vehicle information of a vehicle in the target road network based on the reference speed of the target vehicle.

In this embodiment, based on the reference speed of the above target vehicle, the above executing body may update the speed information in the initial state information in the vehicle information of the target vehicle to the above reference speed.

Alternatively, the above executing body may also generate new positioning information of the target vehicle based on the reference speed of the above target vehicle. Then, the above executing body may also update the vehicle information of the target vehicle based on the reference speed and the new positioning information.

Alternatively, the above executing body may also sequentially use the target number of vehicles in the target road network as the target vehicle, and perform step 203 to determine the reference speed at which each vehicle passes the preset time step. Then, new positioning information is generated. Thus, the above executing body may update the vehicle information of a plurality of vehicles in the target road network.

Figure 3:
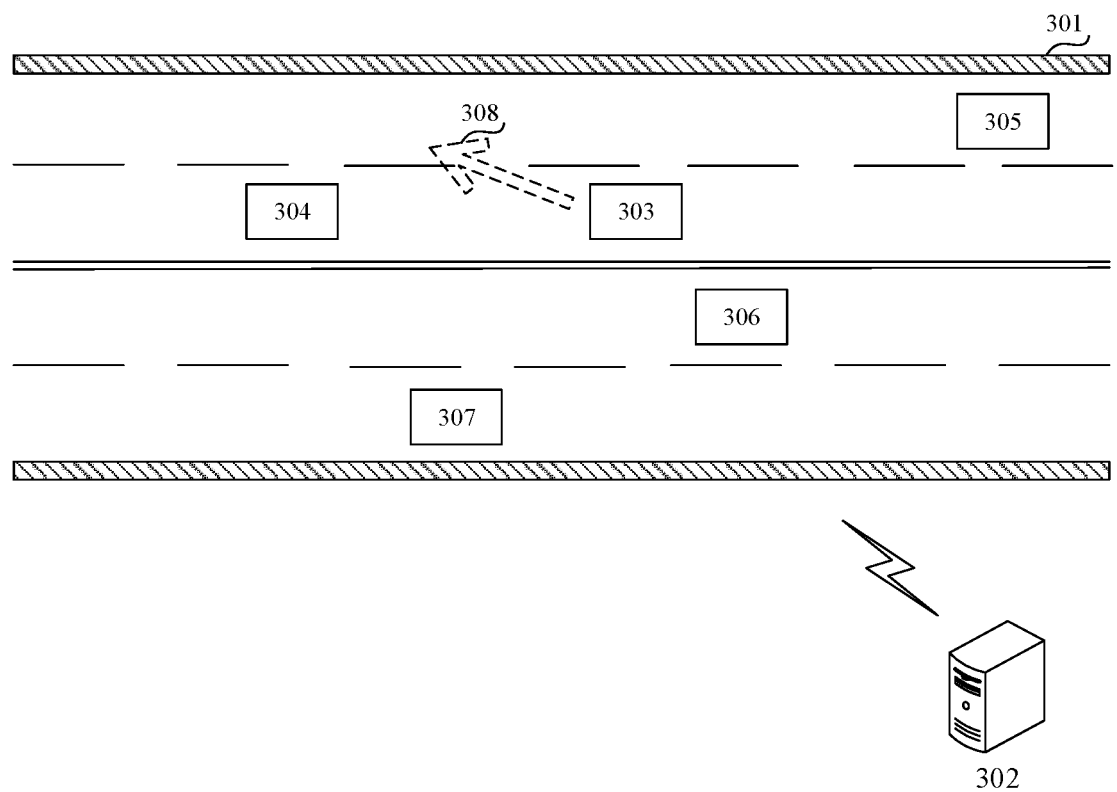
FIG. 3 is a schematic diagram of an application scenario of the method for updating information according to an embodiment of the present disclosure.

Further referring to FIG. 3, FIG. 3 is a schematic diagram of an application scenario of the method for updating information according to an embodiment of the present disclosure. In the application scenario of FIG. 3, a server 302 may acquire the road network structure information of a road section 301 and the vehicle information of vehicles 303, 304, 305, 306 and 307 located in the road section 301. The above vehicle information may be real data collected for the vehicles of the road section 301, or may be preset by a technician or generated by random initialization of the server 302. The server 302 may randomly select the vehicle 303 as the target vehicle. Then, the server 302 may determine the reference speed at which the vehicle 303 passes a preset time step (e.g., 1 s) based on a vehicle dynamics model. Here, the direction of the above reference speed may be shown as 308. Thereafter, the server 302 may update the vehicle information of the vehicle 303 located in the road section 301 based on the reference speed of the vehicle 303. Alternatively, the server 302 may further update the vehicle information of at least one of the vehicles 304, 305, 306 and 307.

At present, one of the existing technologies generally uses an intelligent driver model to determine the speed of the target vehicle based on the distance between the target vehicle and a related vehicle and the speeds of the target vehicle and the related vehicle, but does not involve the physical constraint that takes into account the vehicle motion, resulting in a large difference from the real situation, especially in the situation of changing a lane, the situation of turning, and the like. However, according to the method provided in embodiments of the present disclosure, based on the vehicle dynamics model, the reference speed at which the target vehicle passes the preset time step is determined. Thus, the beneficial effect of improving the authenticity of the traffic simulation result is achieved. In addition, in the existing technology, the traffic flow simulation is performed using a deep learning method. However, this method requires a large amount of manpower and a large number of material resources to acquire samples and perform model training. In the method provided in embodiments of the present disclosure, based on the vehicle dynamics model, the reference speed of the target vehicle at each iteration is updated with the preset time step. Since it is simple to implement the algorithm, the calculation resources are saved, and a large number of requirements of the vehicle for the real-time calculation may be better met.

Figure 4:
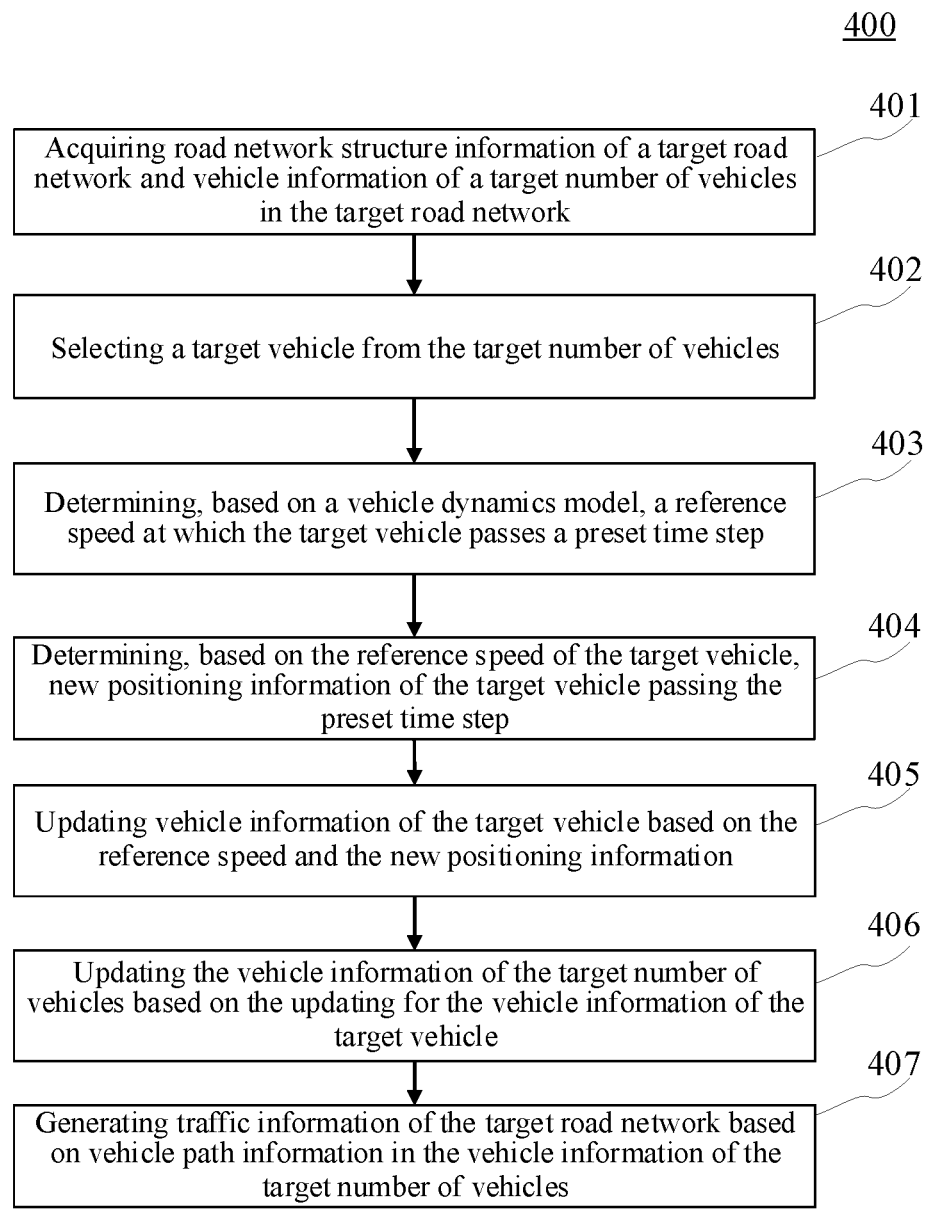
FIG. 4 is a flowchart of the method for updating information according to another embodiment of the present disclosure.

Further referring to FIG. 4, FIG. 4 illustrates a flow 400 of another embodiment of the method for updating information. The flow 400 of the method for updating information includes the following steps.

Step 401, acquiring road network structure information of a target road network and vehicle information of a target number of vehicles in the target road network.

In this embodiment, the initial state information may further include vehicle path information generated based on the road network structure information.

Step 402, selecting a target vehicle from the target number of vehicles.

Step 403, determining, based on a vehicle dynamics model, a reference speed at which the target vehicle passes a preset time step.

Step 401, step 402, and step 403 are consistent with step 201, step 202 and step 203 in the foregoing embodiment, respectively. The description above with respect to step 201, step 202 and step 203 is also applicable to step 401, step 402 and step 403, which will not be repeatedly described here.

Step 404, determining, based on the reference speed of the target vehicle, new positioning information of the target vehicle passing the preset time step.

In this embodiment, an executing body (e.g., the server 105 shown in FIG. 1) of the method for updating information may determine the new positioning information of the target vehicle passing the preset time step, according to a basic formula of dynamics and initial positioning information of the target vehicle.

Step 405, updating vehicle information of the target vehicle based on the reference speed and the new positioning information.

In this embodiment, the above executing body may update the vehicle information of the target vehicle based on the reference speed and the new positioning information.

Step 406, updating the vehicle information of the target number of vehicles based on the updating for the vehicle information of the target vehicle.

In this embodiment, the above executing body may also sequentially use the target number of vehicles in the above target road network as the target vehicle, and perform step 403 to determine the reference speed at which each vehicle passes the preset time step. Then, new positioning information is generated. Thus, the above executing body may update the vehicle information of a plurality of vehicles in the target road network.

Step 407, generating traffic information of the target road network based on vehicle path information in the vehicle information of the target number of vehicles.

In this embodiment, the above executing body may perform an iterative calculation on the basis of the vehicle information of a previous preset time step, to generate the traffic information of the above target road network. Here, the above traffic information may be used to indicate a speed and a position of a vehicle in the above target road network after the vehicle passes a target number of preset time steps.

In some alternative implementations of this embodiment, the above executing body may continue to perform the following steps.

In a first step, the traffic information of the target road network is sent to a display device.

In these implementations, the above executing body may send the traffic information of the target road network to the display device, and thus, the traffic information of the target road network may be displayed on the screen.

In a second step, road facility control information is generated based on the traffic information of the target road network.

In these implementations, the above executing body may also generate the road facility control information based on the generated traffic information of the target road network. Here, the above road facility control information may be, for example, a driving direction of a tidal lane, or may be a control instruction of a traffic light.

In a third step, the road facility control information is sent to a target device.

In these implementations, the above executing body may send the road facility control information to the target device. Here, the target device may be, for example, a controller controlling the display content of a display screen of the tidal lane, or may be a controller of a traffic signal.

As can be seen from FIG. 4, the flow 400 of the method for updating information in this embodiment reflects the step of generating the traffic information of the target road network based on the reference speed of the target vehicle. Thus, according to the scheme described in this embodiment, the traffic information of the road network may be generated in combination with the dynamics constraint of a single vehicle, thereby providing a reliable data basis for the prediction for a traffic situation of a future time period.

Figure 5:
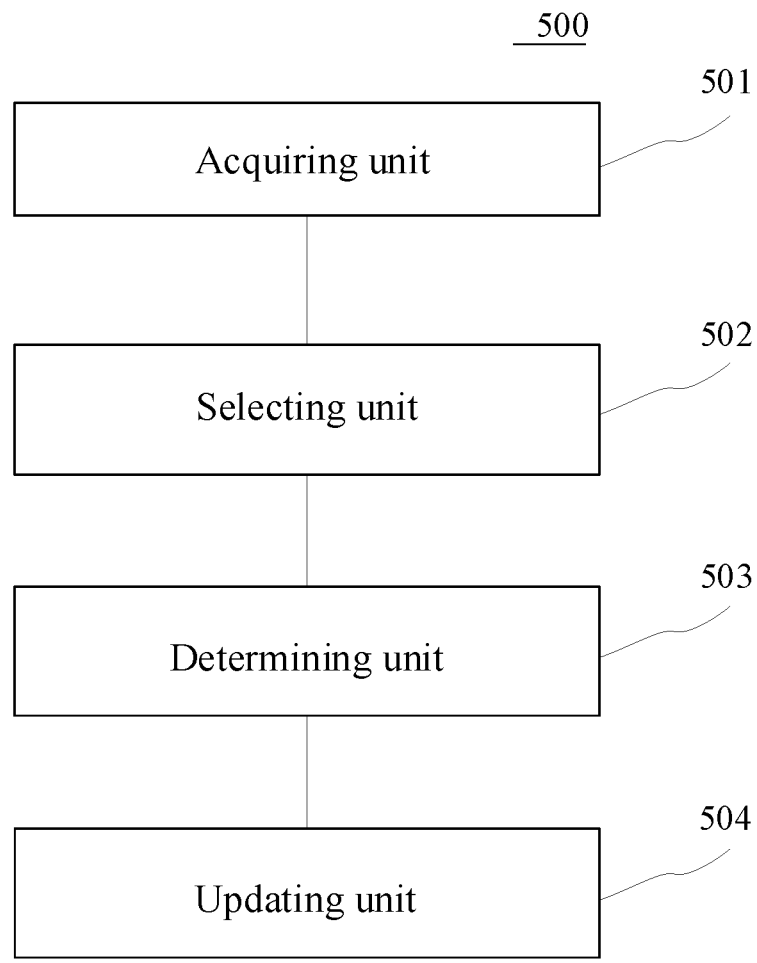
FIG. 5 is a schematic structural diagram of an apparatus for updating information according to an embodiment of the present disclosure.

Further referring to FIG. 5, as an implementation of the method shown in the above drawings, an embodiment of the present disclosure provides an apparatus for updating information. The embodiment of the apparatus according to FIG. 5 corresponds to the embodiment of the method shown in FIG. 2, and the apparatus may be applied in various electronic devices.

As shown in FIG. 5, the apparatus 500 for updating information provided in this embodiment includes an acquiring unit 501, a selecting unit 502, a determining unit 503 and an updating unit 504. Here, the acquiring unit 501 is configured to acquire road network structure information of a target road network and vehicle information of a target number of vehicles in the target road network, the vehicle information including initial state information, perception information and positioning information, and the vehicle information being constrained by the road network structure information. The selecting unit 502 is configured to select a target vehicle from the target number of vehicles. The determining unit 503 is configured to determine, based on a vehicle dynamics model, a reference speed at which the target vehicle passes a preset time step. The updating unit 504 is configured to update vehicle information of a vehicle in the target road network based on the reference speed of the target vehicle.

In this embodiment, for specific processing of the acquiring unit 501, the selecting unit 502, the determining unit 503 and the updating unit 504 in the apparatus 500 for updating information and the technical effects thereof, reference may be made to relative descriptions of step 201, step 202, step 203 and step 204 in the corresponding embodiment of FIG. 2 respectively, which will not be repeatedly described here.

In some alternative implementations of this embodiment, the above determining unit 503 may include a first determining subunit (not shown in the drawings), a second determining subunit (not shown in the drawings), a third determining subunit (not shown in the drawings) and a fourth determining subunit (not shown in the drawings). Here, the above first determining subunit may be configured to determine a safe distance of the target vehicle based on the positioning information of the target number of vehicles, the above safe distance being used to indicate a distance between the target vehicle and an adjacent vehicle. Here, the above second determining subunit may be configured to determine a brake reaction distance of the target vehicle based on the initial state information of the target vehicle. Here, the above third determining subunit may be configured to determine a reference acceleration of the target vehicle based on a quantitative relationship between the safe distance and the brake reaction distance. Here, the above fourth determining subunit, configured to determine, based on the reference acceleration, the reference speed at which the target vehicle passes the preset time step.

In some alternative implementations of this embodiment, the above fourth determining subunit may include a first determining module (not shown in the drawings) and a second determining module (not shown in the drawings). Here, the above first determining module may be configured to determine lane change information of the target vehicle based on the acquired vehicle information, the lane change information being used to indicate whether the target vehicle changes a lane to drive. The above second determining module may be configured to determine, based on the lane change information and the reference acceleration, the reference speed at which the target vehicle passes the preset time step.

In some alternative implementations of this embodiment, a preset lane change driving condition may include a random lane change triggering condition and a random lane change decision condition. The above first determining module may include a first determining submodule (not shown in the drawings) and a first generating submodule (not shown in the drawings). Here, the above first determining submodule may be configured to determine, in response to determining the random lane change triggering condition being satisfied, whether the random lane change decision condition is satisfied. The above first generating submodule may be configured to generate the lane change information of the target vehicle based on whether the random lane change decision condition is satisfied.

In some alternative implementations of this embodiment, the above preset lane change driving condition may include an active lane change triggering condition. The above lane change information may include lane change position information. The above first determining module may include a second determining submodule (not shown in the drawings), a second generating submodule (not shown in the drawings) and a third generating submodule (not shown in the drawings). Here, the above second determining submodule may be configured to determine, in response to determining the active lane change triggering condition being satisfied, a distance between an associated vehicle of an adjacent lane and the target vehicle, the associated vehicle including a vehicle located in an adjacent lane of an identical direction of the target vehicle, having a closest distance from the target vehicle and falling behind the target vehicle. The above second generating submodule may be configured to generate, in response to determining the distance being less than a target threshold, lane change position information for indicating a lane change performed by driving to be behind the associated vehicle. The above third generating submodule may be configured to generate, in response to determining the distance being greater than the target threshold, lane change position information for indicating a lane change performed by driving to be ahead of the associated vehicle.

In some alternative implementations of this embodiment, the above initial state information may further include vehicle path information generated based on the road network structure information. The above updating unit 504 may include: a fifth determining subunit (not shown in the drawings), a first updating subunit (not shown in the drawings), a second updating subunit (not shown in the drawings) and a generating subunit (not shown in the drawings). Here, the above fifth determining subunit may be configured to determine, based on the reference speed of the target vehicle, new positioning information of the target vehicle passing the preset time step. The above first updating subunit may be configured to update vehicle information of the target vehicle based on the reference speed and the new positioning information. The above second updating subunit may be configured to update the vehicle information of the target number of vehicles based on the updating for the vehicle information of the target vehicle. The above generating subunit, configured to generate traffic information of the target road network based on the vehicle path information in the vehicle information of the target number of vehicles. The above traffic information may be used to indicate a speed and a position of the vehicle in the target road network after the vehicle passes a target number of preset time steps.

In some alternative implementations of this embodiment, the apparatus 500 for updating information may further include a first sending unit (not shown in the drawings), a generating unit (not shown in the drawings) and a second sending unit (not shown in the drawings). Here, the above first sending unit may be configured to send the traffic information of the target road network to a display device. The above generating unit may be configured to generate road facility control information based on the traffic information of the target road network. The above second sending unit may be configured to send the road facility control information to a target device.

According to the apparatus provided in embodiments of the present disclosure, the acquiring unit 501 first acquires the road network structure information of the target road network and the vehicle information of the target number of vehicles in the target road network. Here, the vehicle information includes the initial state information, the perception information and the positioning information, and the vehicle information is constrained by the road network structure information. Then, the selecting unit 502 selects the target vehicle from the target number of vehicles. Next, based on the vehicle dynamics model, the determining unit 503 determines the reference speed at which the target vehicle passes the preset time step. Finally, the updating unit 504 updates the vehicle information of the vehicle in the target road network based on the reference speed of the target vehicle. Thus, the beneficial effect of improving the authenticity of the traffic simulation result is achieved.

Figure 6:
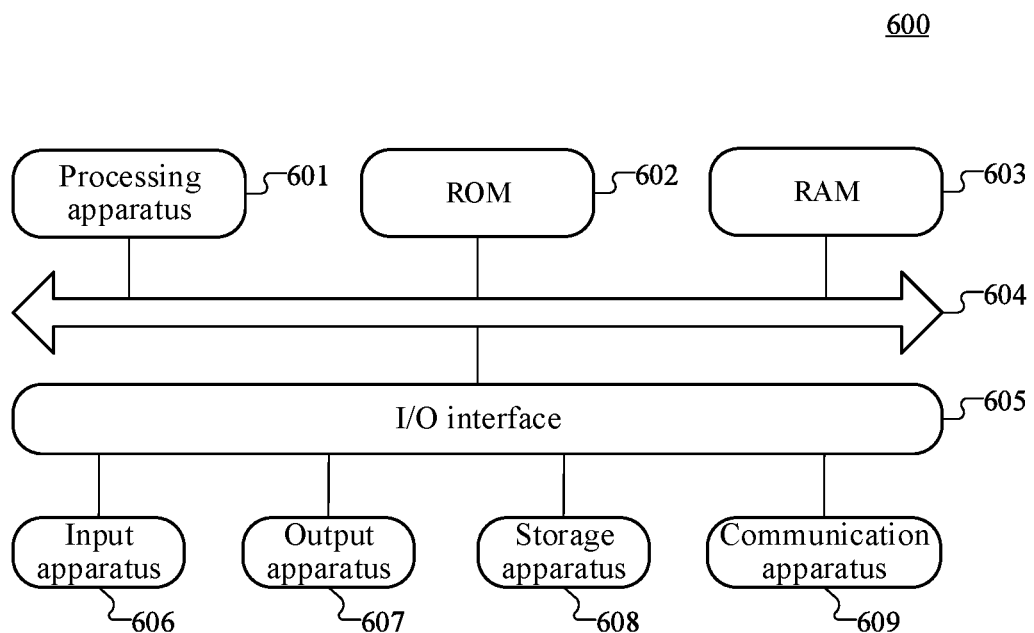
FIG. 6 is a schematic structural diagram of an electronic device adapted to implement embodiments of the present disclosure.

Referring to FIG. 6, FIG. 6 is a schematic structural diagram of an electronic device (e.g., the server in FIG. 1) 600 adapted to implement embodiments of the present disclosure. A terminal device in embodiments of the present disclosure may include, but not limited to, a mobile terminal such as a mobile phone, a notebook computer, a digital broadcast receiver, a PDA (personal digital assistant), a PAD (tablet computer), a PMP (portable multimedia player) and a vehicle-mounted terminal (e.g., a vehicle-mounted navigation terminal), and a fixed terminal such as a digital TV and a desktop computer. The terminal device/server shown in FIG. 6 is merely an example, and should not bring any limitations to the functions and the scope of use of embodiments of the present disclosure.

As shown in FIG. 6, the electronic device 600 may include a processing apparatus (e.g., a central processing unit and a graphics processing unit) 601, which may execute various appropriate actions and processes in accordance with a program stored in a read-only memory (ROM) 602 or a program loaded into a random access memory (RAM) 603 from a storage apparatus 608. The RAM 603 also stores various programs and data required by operations of the electronic device 600. The processing apparatus 601, the ROM 602 and the RAM 603 are connected to each other through a bus 604. An input/output (I/O) interface 605 is also connected to the bus 604.

Generally, the following apparatuses are connected to the I/O interface 605: an input apparatus 606 including, for example, a touch screen, a touch pad, a keyboard, and a mouse; an output apparatus 607 including, for example, a liquid crystal display (LCD), a speaker and a vibrator; the storage apparatus 608 including, for example, a magnetic tape and a hard disk; and a communication apparatus 609. The communication apparatus 609 may allow the electronic device 600 to exchange data with other devices by means of a wireless communication or wired communication. Although FIG. 6 illustrates the electronic device 600 having various apparatuses, it should be understood that it is not required to implement or possess all of the shown apparatuses. More or fewer apparatuses may alternatively be implemented or possessed. Each block shown in FIG. 6 may represent one apparatus, or may represent a plurality of apparatuses as needed.

In particular, according to embodiments of the present disclosure, the process described above with reference to the flowchart may be implemented as a computer software program. For example, an embodiment of the present disclosure includes a computer program product, including a computer program hosted on a computer readable medium, the computer program including program codes for performing the method as illustrated in the flowchart. In such an embodiment, the computer program may be downloaded and installed from a network via the communication apparatus 609, may be installed from the storage apparatus 608, or may be installed from the ROM 602. The computer program, when executed by the processing apparatus 601, implements the above functionalities defined in the method of embodiments of the present disclosure.

It should be noted that the computer readable medium according to some embodiments of the present disclosure may be a computer readable signal medium or a computer readable medium or any combination of the above two. An example of the computer readable medium may include, but is not limited to: electric, magnetic, optical, electromagnetic, infrared, or semiconductor systems, apparatuses, elements, or a combination of any of the above. A more specific example of the computer readable medium may include, but is not limited to: electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In some embodiments of the present disclosure, the computer readable medium may be any tangible medium containing or storing programs, which may be used by, or used in combination with, a command execution system, apparatus or element. In some embodiments of the present disclosure, the computer readable signal medium may include a data signal in the base band or propagating as apart of a carrier wave, in which computer readable program codes are carried. The propagating data signal may take various forms, including but not limited to an electromagnetic signal, an optical signal, or any suitable combination of the above. The computer readable signal medium may also be any computer readable medium except for the computer readable medium. The computer readable medium is capable of transmitting, propagating or transferring programs for use by, or used in combination with, a command execution system, apparatus or element. The program codes contained on the computer readable medium may be transmitted with any suitable medium, including but not limited to: wireless, wired, optical cable, RF medium, etc., or any suitable combination of the above.

The computer readable medium may be the computer readable medium included in the above server, or a stand-alone computer readable medium not assembled into the server. The above computer readable medium carries one or more programs. The one or more programs, when executed by the server, cause the server to: acquire road network structure information of a target road network and vehicle information of a target number of vehicles in the target road network, the vehicle information including initial state information, perception information and positioning information, and the vehicle information being constrained by the road network structure information; select a target vehicle from the target number of vehicles; determine, based on a vehicle dynamics model, a reference speed at which the target vehicle passes a preset time step; and update vehicle information of a vehicle in the target road network based on the reference speed of the target vehicle.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In a circumstance involving a remote computer, the remote computer may be connected to a user's computer through any network, including local area network (LAN) or wide area network (WAN), or be connected to an external computer (for example, connected through the Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logical functions. It should be further noted that, in some alternative implementations, the functions denoted by the blocks may also occur in a sequence different from the sequences shown in the figures. For example, any two blocks presented in succession may be executed substantially in parallel, or they may sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in embodiments of the present disclosure may be implemented by means of software or hardware. The described units may also be provided in a processor. For example, the processor may be described as: a processor including an acquiring unit, a selecting unit, a determining unit and an updating unit. Here, the names of these units do not in some cases constitute a limitation to such units themselves. For example, the acquiring unit may alternatively be described as "a unit for acquiring road network structure information of a target road network and vehicle information of a target number of vehicles in the target road network."

The above description provides an explanation of certain embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for updating information, comprising:
   acquiring road network structure information of a target road network and vehicle information of a target number of vehicles in the target road network, the vehicle information comprising initial state information, perception information and positioning information, and the vehicle information being constrained by the road network structure information;
   selecting a target vehicle from the target number of vehicles;
   determining, based on a vehicle dynamics model, a reference speed at which the target vehicle passes a preset time step, wherein the vehicle dynamics model comprises a relationship among an angle of a steering wheel of the target vehicle, an angle of a wheel of the target vehicle, and a speed of the target vehicle; and
   updating vehicle information of a vehicle in the target road network based on the reference speed of the target vehicle.

2. The method according to claim 1, wherein the determining, based on the vehicle dynamics model, the reference speed at which the target vehicle passes the preset time step comprises:
   determining a safe distance of the target vehicle based on the positioning information of the target number of vehicles, the safe distance being used to indicate a distance between the target vehicle and an adjacent vehicle;

determining a brake reaction distance of the target vehicle based on the initial state information of the target vehicle;

determining a reference acceleration of the target vehicle based on a quantitative relationship between the safe distance and the brake reaction distance; and determining, based on the reference acceleration, the reference speed at which the target vehicle passes the preset time step.

3. The method according to claim 2, wherein the determining, based on the reference acceleration, the reference speed at which the target vehicle passes the preset time step comprises:

determining lane change information of the target vehicle based on the acquired vehicle information, the lane change information being used to indicate whether the target vehicle changes a lane to drive; and determining, based on the lane change information and the reference acceleration, the reference speed at which the target vehicle passes the preset time step.

4. The method according to claim 3, wherein a preset lane change driving condition comprises a random lane change triggering condition and a random lane change decision condition, and the determining lane change information of the target vehicle based on the acquired vehicle information comprises:

determining, in response to determining the random lane change triggering condition being satisfied, whether the random lane change decision condition is satisfied; and generating the lane change information of the target vehicle based on whether the random lane change decision condition is satisfied.

5. The method according to claim 3, wherein the preset lane change driving condition comprises an active lane change triggering condition, the lane change information comprises lane change position information, and the determining lane change information of the target vehicle based on the acquired vehicle information comprises:

determining, in response to determining the active lane change triggering condition being satisfied, a distance between an associated vehicle of an adjacent lane and the target vehicle, the associated vehicle comprising a vehicle located in an adjacent lane of an identical direction of the target vehicle, having a closest distance from the target vehicle and falling behind the target vehicle;

generating, in response to determining the distance being less than a target threshold, lane change position information for indicating a lane change performed by driving to be behind the associated vehicle; and generating, in response to determining the distance being greater than the target threshold, lane change position information for indicating a lane change performed by driving to be ahead of the associated vehicle.

6. The method according to claim 1, wherein the initial state information further comprises vehicle path information generated based on the road network structure information, and the updating vehicle information of the vehicle in the target road network based on the reference speed of the target vehicle comprises:

determining, based on the reference speed of the target vehicle, new positioning information of the target vehicle passing the preset time step;

updating vehicle information of the target vehicle based on the reference speed and the new positioning information;

updating the vehicle information of the target number of vehicles based on the updating for the vehicle information of the target vehicle; and generating traffic information of the target road network based on the vehicle path information in the vehicle information of the target number of vehicles, the traffic information being used to indicate a speed and a position of the vehicle in the target road network after the vehicle passes a target number of preset time steps.

7. The method according to claim 6, further comprising:

sending the traffic information of the target road network to a display device;

generating road facility control information based on the traffic information of the target road network; and sending the road facility control information to a target device.

8. The method according to claim 1, wherein in the relationship, a change of the angle of the steering wheel is determined by the angle of the wheel, the speed of the target vehicle, a wheelbase of the target vehicle, and the preset time step.

9. The method according to claim 8, wherein determining, based on the vehicle dynamics model, the reference speed at which the target vehicle passes the preset time step comprises:

determining a quasi-reference speed based on an initial speed, an initial acceleration, and the preset time step;

determining the change of the angle of the steering wheel during the preset time step, the angle of the wheel, and the wheelbase;

determining whether the relationship is satisfied by the quasi-reference speed, the change of the angle of the steering wheel during the preset time step, the angle of the wheel, the wheelbase and the preset time step; and determining the quasi-reference speed as the reference speed, in response to determining that the relationship is satisfied by the quasi-reference speed, the change of the angle of the steering wheel during the preset time step, the angle of the wheel, the wheelbase and the preset time step.

10. An apparatus for updating information, comprising:

at least one processor; and a memory storing instructions, the instructions when executed by the at least one processor, causing the at least one processor to perform operations, the operations comprising:

acquiring road network structure information of a target road network and vehicle information of a target number of vehicles in the target road network, the vehicle information comprising initial state information, perception information and positioning information, and the vehicle information being constrained by the road network structure information;

selecting a target vehicle from the target number of vehicles;

determining, based on a vehicle dynamics model, a reference speed at which the target vehicle passes a preset time step, wherein the vehicle dynamics model comprises a relationship among an angle of a steering wheel of the target vehicle, an angle of a wheel of the target vehicle, and a speed of the target vehicle; and updating vehicle information of a vehicle in the target road network based on the reference speed of the target vehicle.

11. The apparatus according to claim 10, wherein the determining, based on the vehicle dynamics model, the reference speed at which the target vehicle passes the preset time step comprises:
  determining a safe distance of the target vehicle based on the positioning information of the target number of vehicles, the safe distance being used to indicate a distance between the target vehicle and an adjacent vehicle;
  determining a brake reaction distance of the target vehicle based on the initial state information of the target vehicle;
  determining a reference acceleration of the target vehicle based on a quantitative relationship between the safe distance and the brake reaction distance; and
  determining, based on the reference acceleration, the reference speed at which the target vehicle passes the preset time step.

12. The apparatus according to claim 11, wherein the determining, based on the reference acceleration, the reference speed at which the target vehicle passes the preset time step comprises:
  determining lane change information of the target vehicle based on the acquired vehicle information, the lane change information being used to indicate whether the target vehicle changes a lane to drive; and
  determining, based on the lane change information and the reference acceleration, the reference speed at which the target vehicle passes the preset time step.

13. The apparatus according to claim 12, wherein a preset lane change driving condition comprises a random lane change triggering condition and a random lane change decision condition, and the determining lane change information of the target vehicle based on the acquired vehicle information comprises:
  determining, in response to determining the random lane change triggering condition being satisfied, whether the random lane change decision condition is satisfied; and
  generating the lane change information of the target vehicle based on whether the random lane change decision condition is satisfied.

14. The apparatus according to claim 12, wherein the preset lane change driving condition comprises an active lane change triggering condition, the lane change information comprises lane change position information, and the determining lane change information of the target vehicle based on the acquired vehicle information comprises:
  determining, in response to determining the active lane change triggering condition being satisfied, a distance between an associated vehicle of an adjacent lane and the target vehicle, the associated vehicle comprising a vehicle located in an adjacent lane of an identical direction of the target vehicle, having a closest distance from the target vehicle and falling behind the target vehicle;
  generating, in response to determining the distance being less than a target threshold, lane change position information for indicating a lane change performed by driving to be behind the associated vehicle; and
  generating, in response to determining the distance being greater than the target threshold, lane change position information for indicating a lane change performed by driving to be ahead of the associated vehicle.

15. The apparatus according to claim 10, wherein the initial state information further comprises vehicle path information generated based on the road network structure information, and the updating vehicle information of the vehicle in the target road network based on the reference speed of the target vehicle comprises:
  determining, based on the reference speed of the target vehicle, new positioning information of the target vehicle passing the preset time step;
  updating vehicle information of the target vehicle based on the reference speed and the new positioning information;
  updating the vehicle information of the target number of vehicles based on the updating for the vehicle information of the target vehicle; and
  generating traffic information of the target road network based on the vehicle path information in the vehicle information of the target number of vehicles, the traffic information being used to indicate a speed and a position of the vehicle in the target road network after the vehicle passes a target number of preset time steps.

16. The apparatus according to claim 15, the operations further comprising:
  sending the traffic information of the target road network to a display device;
  generating road facility control information based on the traffic information of the target road network; and
  sending the road facility control information to a target device.

17. A non-transitory computer readable medium, storing a computer program thereon, wherein the program, when executed by a processor, causes the processor to perform operations, the operations comprising:
  acquiring road network structure information of a target road network and vehicle information of a target number of vehicles in the target road network, the vehicle information comprising initial state information, perception information and positioning information, and the vehicle information being constrained by the road network structure information;
  selecting a target vehicle from the target number of vehicles;
  determining, based on a vehicle dynamics model, a reference speed at which the target vehicle passes a preset time step, wherein the vehicle dynamics model comprises a relationship among an angle of a steering wheel of the target vehicle, an angle of a wheel of the target vehicle, and a speed of the target vehicle; and
  updating vehicle information of a vehicle in the target road network based on the reference speed of the target vehicle.

18. The non-transitory computer readable medium according to claim 17, wherein the determining, based on the vehicle dynamics model, the reference speed at which the target vehicle passes the preset time step comprises:
  determining a safe distance of the target vehicle based on the positioning information of the target number of vehicles, the safe distance being used to indicate a distance between the target vehicle and an adjacent vehicle;
  determining a brake reaction distance of the target vehicle based on the initial state information of the target vehicle;
  determining a reference acceleration of the target vehicle based on a quantitative relationship between the safe distance and the brake reaction distance; and
  determining, based on the reference acceleration, the reference speed at which the target vehicle passes the preset time step.

19. The non-transitory computer readable medium according to claim 18, wherein the determining, based on the reference acceleration, the reference speed at which the target vehicle passes the preset time step comprises:
- determining lane change information of the target vehicle based on the acquired vehicle information, the lane change information being used to indicate whether the target vehicle changes a lane to drive; and
- determining, based on the lane change information and the reference acceleration, the reference speed at which the target vehicle passes the preset time step.

20. The non-transitory computer readable medium according to claim 19, wherein a preset lane change driving condition comprises a random lane change triggering condition and a random lane change decision condition, and the determining lane change information of the target vehicle based on the acquired vehicle information comprises:
- determining, in response to determining the random lane change triggering condition being satisfied, whether the random lane change decision condition is satisfied; and
- generating the lane change information of the target vehicle based on whether the random lane change decision condition is satisfied.

* * * * *